(12) United States Patent
Azhdast et al.

(10) Patent No.: US 9,975,195 B2
(45) Date of Patent: May 22, 2018

(54) ARRANGEMENT AND METHOD FOR THE REPRODUCIBLE APPLICATION OF SMALL AMOUNTS OF LIQUID

(71) Applicant: SMART PAC GMBH TECHNOLOGY SERVICES, Nauen (DE)

(72) Inventors: Mohammad Hossein Azhdast, Berlin (DE); Siavash Hosseinpour Tabrizi, Berlin (DE)

(73) Assignee: PAC TECH-PACKAGING TECHNOLOGIES GMBH, Nauen (DE)

( * ) Notice: Subject to any disclaimer, the term of this patent is extended or adjusted under 35 U.S.C. 154(b) by 255 days.

(21) Appl. No.: 15/022,918

(22) PCT Filed: Jul. 17, 2014

(86) PCT No.: PCT/EP2014/065396
§ 371 (c)(1),
(2) Date: Mar. 17, 2016

(87) PCT Pub. No.: WO2015/039783
PCT Pub. Date: Mar. 26, 2015

(65) Prior Publication Data
US 2016/0228967 A1    Aug. 11, 2016

(30) Foreign Application Priority Data

Sep. 20, 2013 (DE) .......................... 10 2013 110 402

(51) Int. Cl.
*B23K 3/06* (2006.01)
*B23K 1/005* (2006.01)
(Continued)

(52) U.S. Cl.
CPC .................................. *B23K 3/0638* (2013.01)

(58) Field of Classification Search
CPC .......... B23K 3/06; B23K 1/005; B23K 26/34; B23K 26/342
(Continued)

(56) References Cited

U.S. PATENT DOCUMENTS 2,913,187 A    11/1959   Anderson
3,291,396 A    12/1966   Walter
(Continued)

FOREIGN PATENT DOCUMENTS

DE        94 15 884 U1    12/1994
DE        695 14 174 T2   12/1999
(Continued)

*Primary Examiner* — Samuel M Heinrich
(74) *Attorney, Agent, or Firm* — Lazaris IP

(57) ABSTRACT

An arrangement (10) for the reproducible application of small amounts of liquid onto a target surface, comprising a liquid reservoir (28, 38) with an opening (24) which can be positioned above the target surface, a plunger (52, 60) which is arranged so as to be movable in an opening direction, and a drive (14) for moving the plunger, is distinguished by the fact that the opening (50) is formed in a projecting, tapering tip or nozzle (48), and the plunger (52, 60) extends all the way through the liquid (70) situated in the liquid reservoir (28, 38) and into the tip or nozzle (48), such that during a plunger movement in an opening direction, liquid portions in the opening region are moved outward through the opening by the plunger.

10 Claims, 8 Drawing Sheets

(51) Int. Cl.
*B23K 26/34* (2014.01)
*B23K 26/342* (2014.01)

(58) Field of Classification Search
USPC .......... 219/121.65, 121.66, 121.6; 222/593
See application file for complete search history.

(56) References Cited

U.S. PATENT DOCUMENTS

| | | |
|---|---|---|
| 4,595,816 A | 6/1986 | Hall et al. |
| 5,425,493 A | 6/1995 | Interrante et al. |
| 6,235,473 B1 | 5/2001 | Friedman et al. |
| 6,336,581 B1 | 1/2002 | Tuchiya et al. |
| 2006/0021976 A1 | 10/2006 | Wagoh et al. |
| 2006/0219760 A1 | 10/2006 | Wagoh et al. |
| 2009/0095825 A1 | 4/2009 | Ahmadi et al. |
| 2011/0315747 A1 | 12/2011 | Yamamoto et al. |
| 2014/0061182 A1* | 3/2014 | Fischer .................. B23K 3/02 219/232 |

FOREIGN PATENT DOCUMENTS

| | | |
|---|---|---|
| DE | 10 2004 054 923 A1 | 11/2005 |
| DE | 10 2007 027291 A1 | 12/2007 |
| DE | 603 19 596 T2 | 4/2008 |
| DE | 10 2011 108799 A1 | 1/2013 |
| EP | 0752294 A2 | 1/1997 |
| EP | 0 700 730 B1 | 12/1999 |
| FR | 2040681 A5 | 1/1971 |
| JP | S57190769 A | 11/1982 |
| JP | S59124662 U | 8/1984 |
| JP | 2000294591 A | 10/2000 |
| JP | 2002057450 A | 2/2002 |
| JP | 2010225680 A | 10/2010 |
| JP | 2011031301 A | 2/2011 |
| JP | 2012006076 A | 1/2012 |
| WO | WO 03006197 A1 | 1/2003 |
| WO | WO 03024653 A1 | 3/2003 |
| WO | 2005100232 A2 | 10/2005 |
| WO | 2008108097 A1 | 9/2008 |
| WO | WO 2008108097 A1 | 9/2008 |
| WO | WO2015039783 | 3/2015 |

\* cited by examiner

ARRANGEMENT AND METHOD FOR THE REPRODUCIBLE APPLICATION OF SMALL AMOUNTS OF LIQUID

CROSS REFERENCE TO RELATED PATENT APPLICATIONS

This patent application is filed herewith for the U.S. National Stage under 35 U.S.C. § 371 and claims priority to PCT application PCT/EP2014/065396, with an international filing date of Jul. 17, 2014. The contents of this application are incorporated in their entirety herein.

STATEMENT REGARDING FEDERALLY-SPONSORED RESEARCH OR DEVELOPMENT

Not applicable.

TECHNICAL FIELD

The invention relates to an assembly for reproducible application of small amounts of liquid onto a target surface, comprising
(a) a liquid reservoir with an opening positioned above the target surface,
(b) a plunger movable in the direction of the opening, and
(c) an actuator for moving the plunger.
With such an assembly the liquid can be positioned on a selected target surface by moving a plunger.

BACKGROUND OF THE INVENTION

Dosing systems, such as injection devices, are known, where the liquid is pushed through an opening by a piston or plunger. The piston or plunger sits on one side of the liquid reservoir and the opening is typically positioned at the opposite end. If the piston or plunger is moved the entire liquid is moved. Thereby, the reproducibility is limited. The piston or plunger is sealingly guided in the liquid reservoir. If the liquid is used up the liquid reservoir is re-filled in such a way that it is filled through the exit opening or by removing the piston or plunger for filling.

Furthermore, dosing systems are known where the opening is closed, for example, with a shutter. There is a risk that remains of liquid remain in the range of the shutter or the opening and decrease the reproducibility of the dosing.

Finally, assemblies are known where individual balls of solder material are taken up with a tip. The balls are placed and a laser beam is incident on the solder material through an opening whereby it melts and forms the soldering. With such assemblies there is no liquid reservoir.

US 2009/095825 A1 discloses a dispenser for fluids with a fluid chamber and a nozzle assembly. The nozzle assembly is releasably connected to the fluid chamber.

WO 2008/108097 A1 discloses a discharging device for filling material, such as, for example, solder paste. In the device it is regulated by means of a position deciding that the front end section of a plunger is stopped in the vicinity of the inner wall of the liquid chamber if the plunger is moved towards the liquid outlet.

DE 10 2011 108799 A1 discloses a dosing system for a liquid to viscous dosing material with an actor system comprising at least on operating element and a jet with an exit opening.

US 2011/315747 A1 discloses a mounting head for solder balls with a hopper, a mounting head and a pressing pin insertable into the hopper and mounting head. The mounting head has an inner diameter restricting the movement of the solder balls. For feeding soldering balls the pressing pin presses the solder balls. Thereby the solder balls are consecutively applied on a target substrate.

US 2006/021976 A1 discloses a method and a device for soldering, a connecting method, a connecting device and a jet unit. U.S. Pat. No. 6,336,581 B1 discloses a device for connecting soldering balls and a capillary tube for this purpose. WO 03006197 discloses a device for applying soldering material by positioning in a solid state and melding and finally passing on a substrate by pressurized gas. WO 03/024653 A1 discloses a method for the generation of a soldering connection. JP 2002057450 discloses a soldering device. EP 0752294 A2 discloses a device for ejecting liquid soldering material. FR 2040681 A5 discloses a device for grabbing, transporting and welding small elements.

BRIEF SUMMARY OF THE INVENTION

It is an object of the invention to provide an assembly of the above mentioned kind with high reproducibility. According to the present invention this object is achieved in that
(d) the opening is formed by a projecting, conical tip or jet, and
(e) the plunger extends through the entire liquid present in the liquid reservoir down into the tip or jet, whereby portions of the liquid are moved through the opening outwards by the plunger by a plunger movement in the direction of the opening.

The plunger must not necessarily close the opening. In such a way the liquid is dosed without a shutter and without having to fully close the opening. Such portions of the liquid are moved by the plunger which are present in the range of the opening. It has been shown that a higher reproducibility can be achieved thereby than with moving a piston pushing on the liquid from above. The movement of the liquid is not only effected by the front end surface of the plunger but essentially from the lateral surface.

An annular canal is formed in the range of the tip or jet between the inner wall of the tip or jet and the lateral surface of the plunger. The liquid flows through the annular opening outwards. According to the narrowed flow cross section the liquid is dragged by the lateral surface and pushed outwards through the opening.

The dose can be adjusted by adjusting the viscosity, the penetration depth of the plunger in the tip or jet, the frequency of the upward- and downward movement of the plunger and by the geometry and the opening cross section of the tip or jet and thereby adapted to the application.

It is a particular advantage of the invention that not only a high reproducibility is achieved but also that the liquid reservoir has a free cross section in its upper range. Thereby the liquid can be continuously filled and re-filled without having to interrupt the dosing process.

In a modification of the invention it is provided that
(a) the liquid is solder material or any other material which is solid at room temperature, and
(b) the liquid reservoir is heatable to a temperature above the melting point of the material.

With such an assembly, solid material, such as solder material, can be re-filled from above. The mass will melt in the heated reservoir. The material is liquid at the lower end and can be dosed in the way above described.

Preferably a laser is provided emitting radiation towards the range of the opening. The tip or jet in such an assembly can freely project outwards. There is a risk that this range is too cold and solid solder material cools down before the actual dosing. This is not desired. Cold soldering points can be formed and solder material can oxidize. The radiation of the laser can, therefore, be directed towards the opening range and provide additional heating.

In a particularly advantageous modification of the invention the plunger is hollow and the laser radiation is guided through the plunger to the range of the opening. In such a way not only a compact assembly is achieved where the laser radiation is applied exactly in the opening range. The laser does not interfere with the positioning above, for example, a wafer.

In a further modification of the invention a gas source is provided with gas adapted to be guided into the range of the opening. Such gas may be nitrogen or any other inert gas or gas mixture. With an inert gas it is avoided that liquid will oxidize early and cause undesired effects. The gas may also be heated as an alternative or additional heating. Thereby an additional heating of the outwardly projecting jet or tip is achieved.

In a preferred embodiment of the invention the gas is guided through an outer canal from the gas source to the range of the opening, whereby heat can be absorbed from the liquid reservoir. The liquid reservoir, for example, can be formed by a bore hole in a heated metal cylinder. A spiral-shaped groove can be provided at its outside which is closed to form a canal by a tube shaped cover which is shifted onto the metal cylinder and sealed. The gas can be inserted from the top into the canal and exit at its lower end in a way that it flows in the direction of the jet or tip. Thereby, it is achieved that the heat is transferred and the outer range is cooled whereby the handling is facilitated. Additionally it is achieved that the heat absorbed by the gas may be used for heating the jet or tip.

The gas may also be guided into the range above the liquid in the liquid reservoir. It can have an increased pressure in order to ensure that the liquid will always flow downwards. Furthermore an inert gas can prevent oxidizing of the liquid.

Preferably, the liquid reservoir is filled from another reservoir which is connected to the liquid reservoir by an inclined canal. In order to achieve a high reproducibility and dosing accuracy it is advisable to choose the liquid reservoir not too large. A uniform heating may then be realized better than with a large liquid reservoir. In particular, if the liquid has a melting point above room temperature, as it is the case with solder material, it is desirable to provide another reservoir where the material is present in solid form. The material may be present in the form of balls or other loose bulk material and a vibrator may be provided adapted to guide the balls or loose material through the canal into the liquid reservoir upon activation. There is no high accuracy necessary since the liquid reservoir is only filled or re-filled. Preferably, a filling-level sensor is provided in the upper range of the liquid reservoir the signal of which can be used for controlling the vibrator. If the sensor level is reached the vibrator is shut off. If the level falls below a lower threshold or after a selected time the vibrator is activated again.

Further modifications of the present invention are subject matter of the subclaims. An embodiment is described below in greater detail with reference to the accompanying drawings.

DETAILED DESCRIPTION OF THE INVENTION

Figure 1:
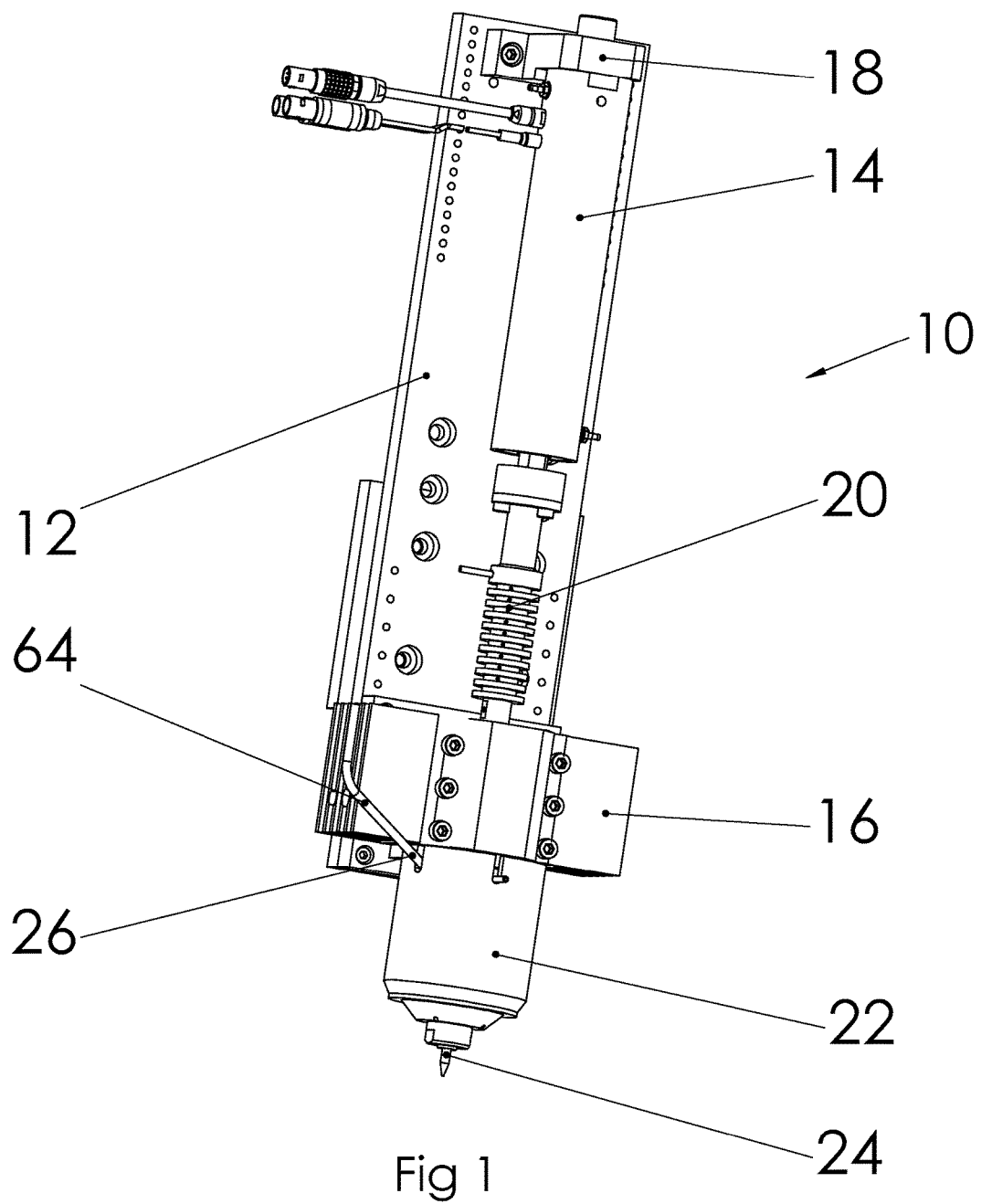
FIG. 1 is a perspective view of an assembly for applying solder material on a target surface.
Figure 2:
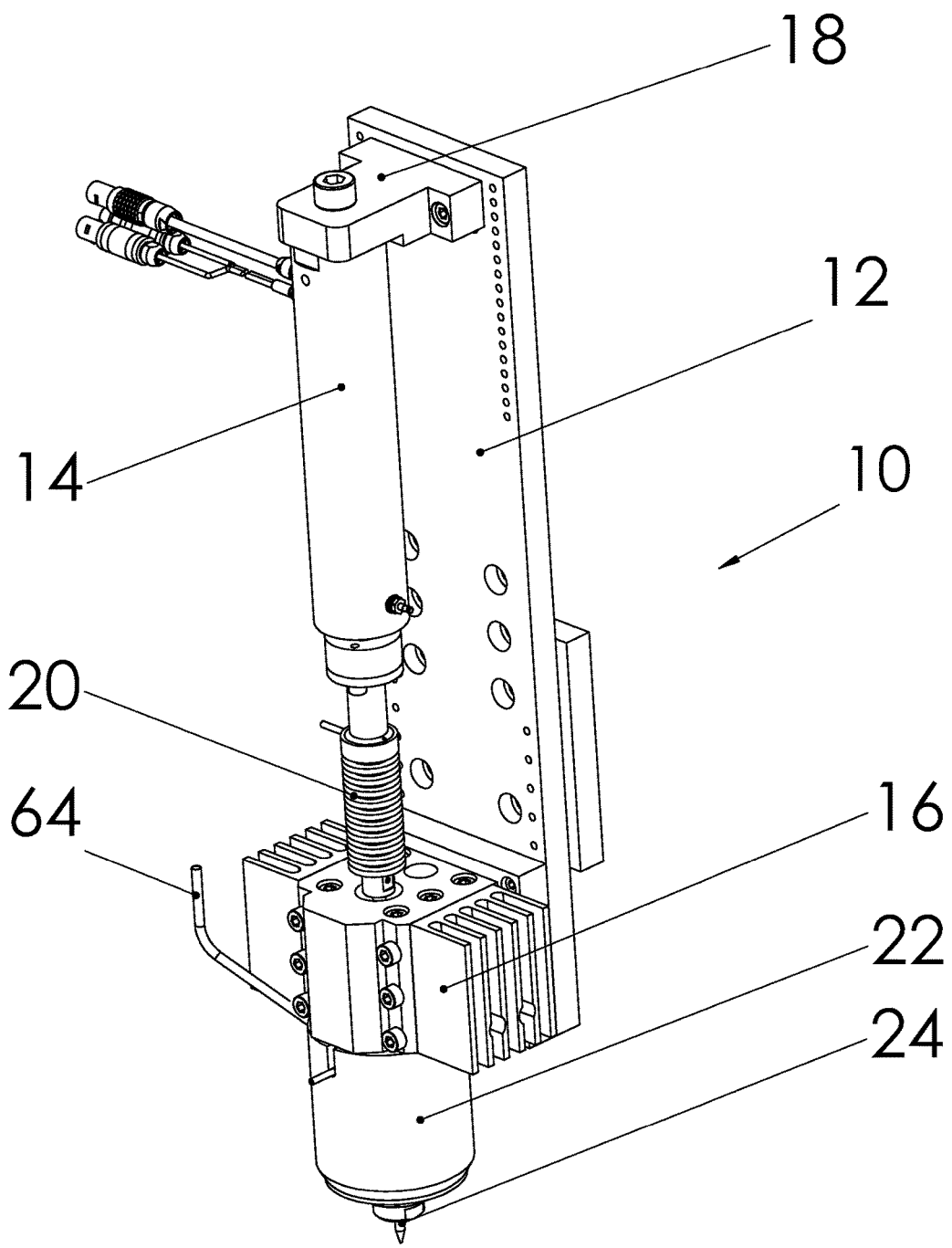
FIG. 2 shows the assembly of FIG. 1 from a different perspective.
Figure 3:
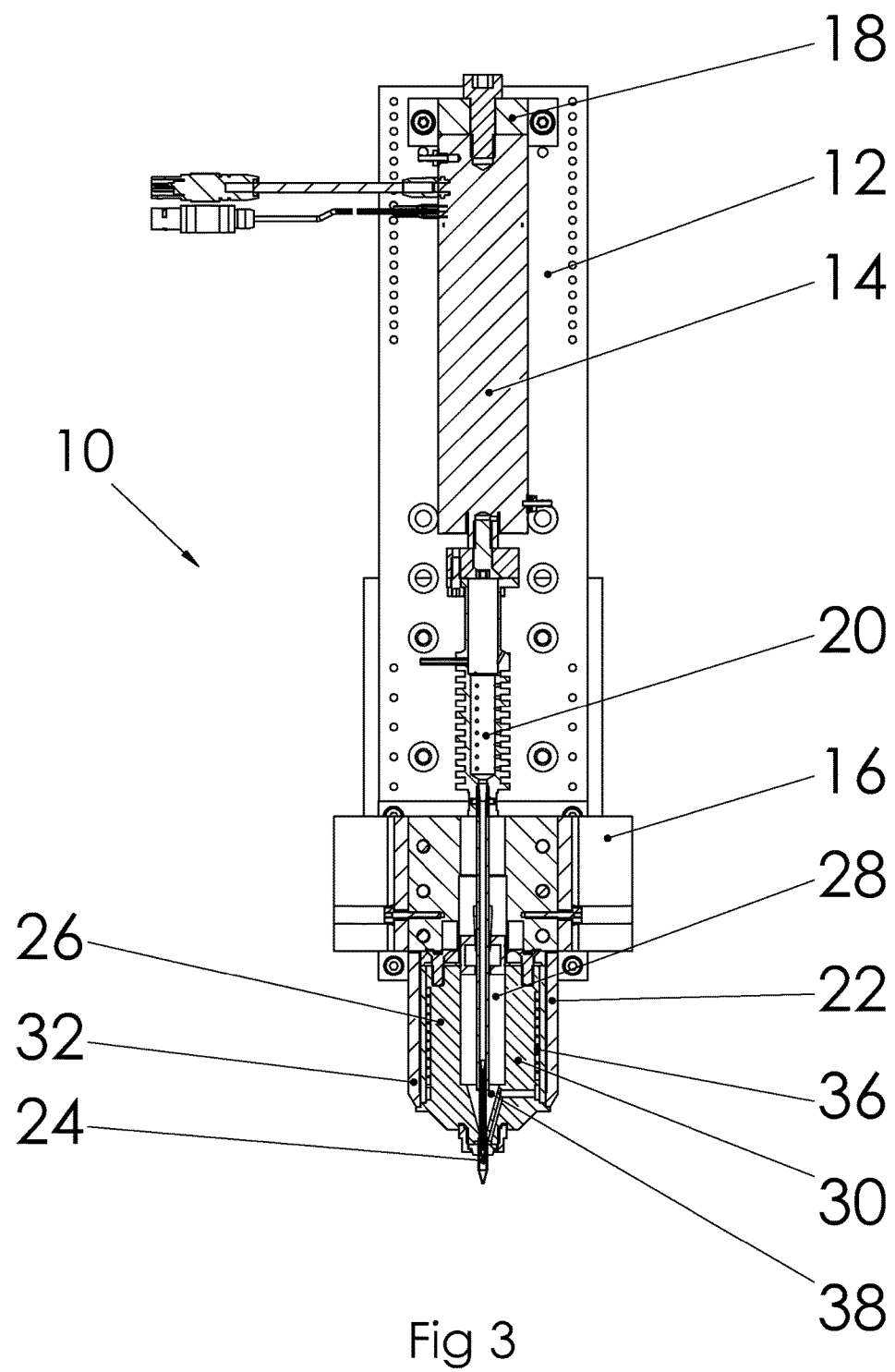
FIG. 3 is a vertical longitudinal cross section of the assembly of FIG. 1.
Figure 4:
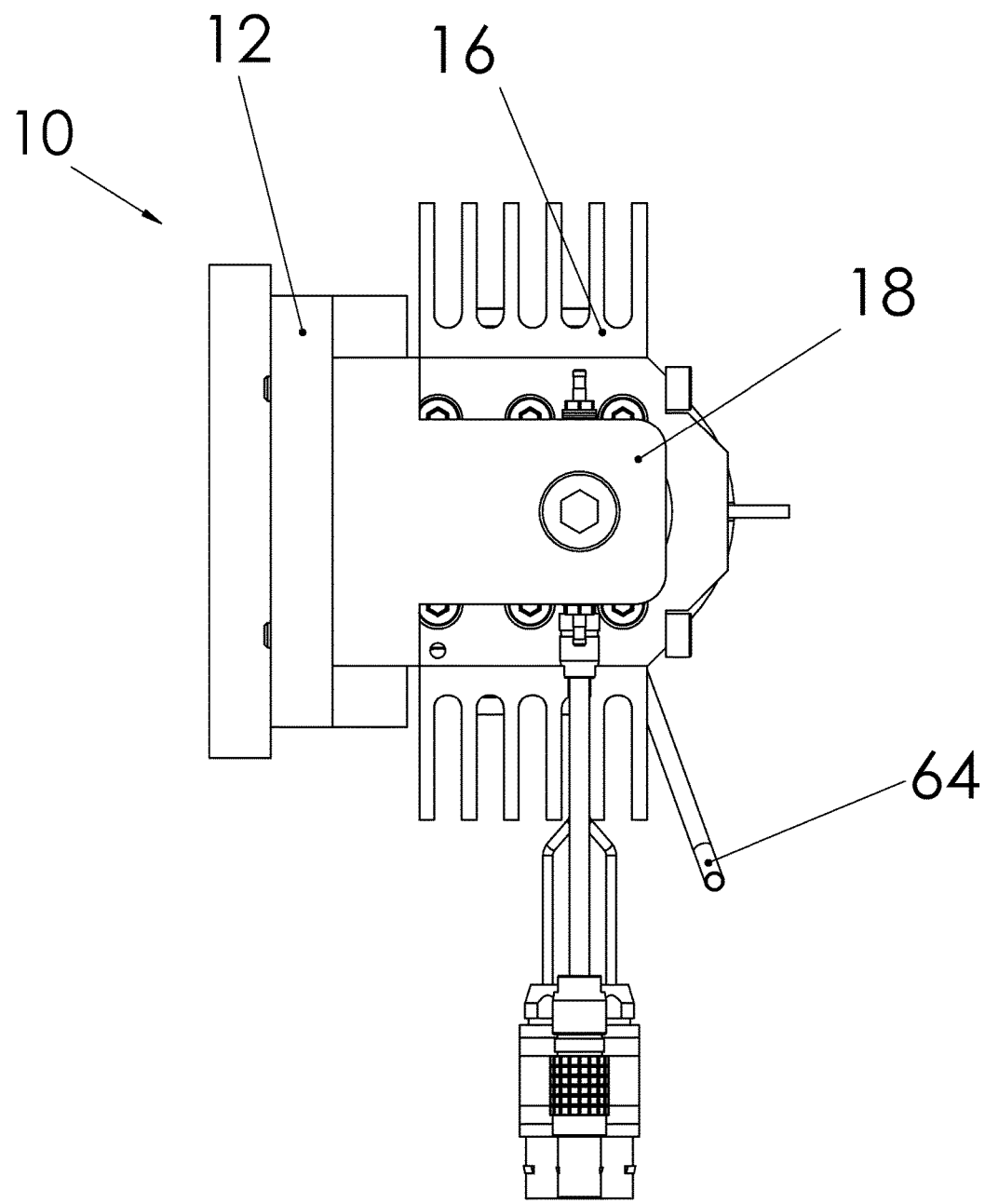
FIG. 4 is a top view of the assembly of FIG. 1.
Figure 5:
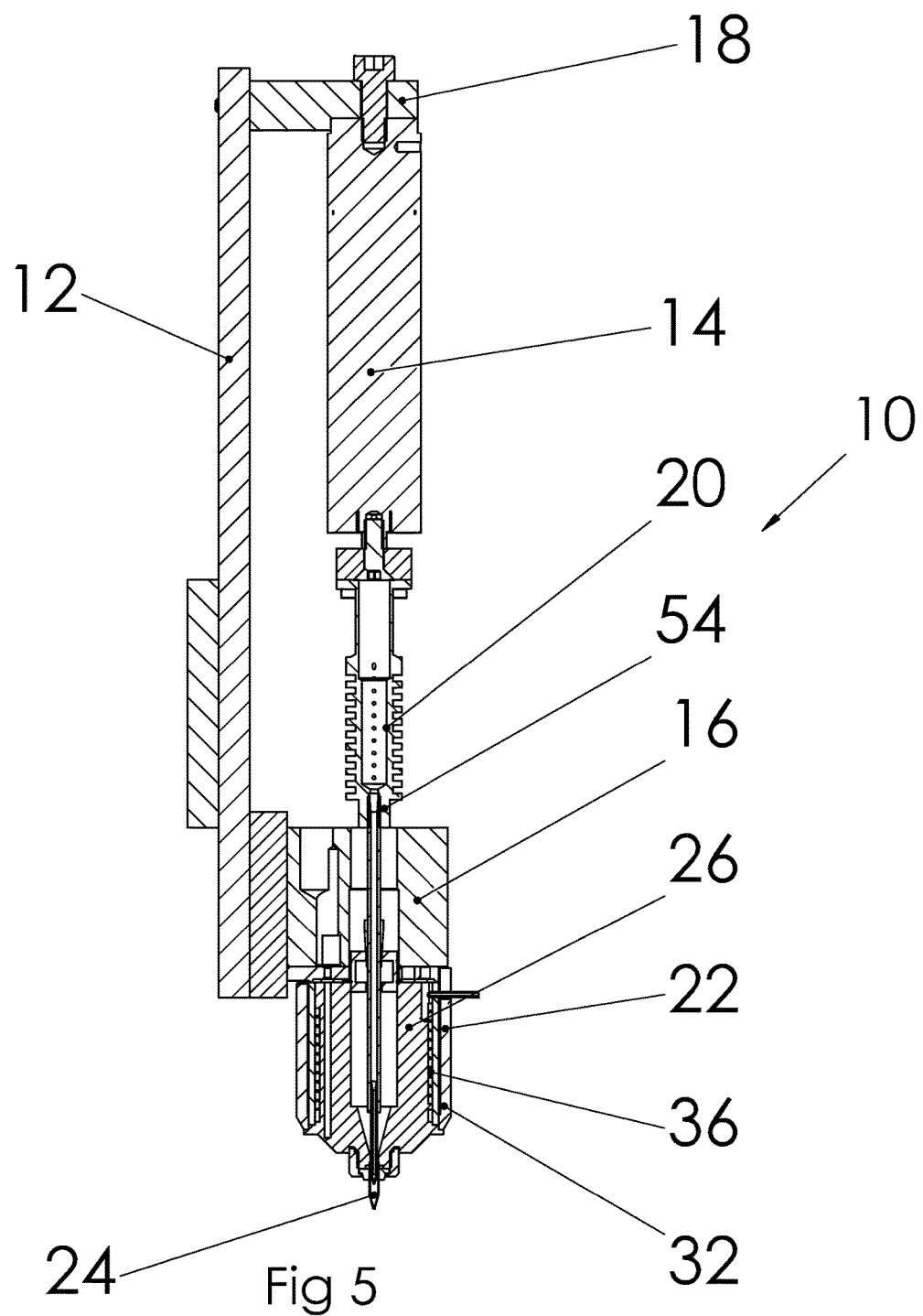
FIG. 5 is a vertical longitudinal cross section of the assembly of FIG. 1 along a cross sectional plane which is rotated by 90 degrees with respect to FIG. 3.

The figures show an automatic solder assembly which is generally designated with numeral 10. Contacts on a wafer can be automatically soldered with such a solder assembly. For this purpose either the wafer is moved under the assembly or the solder assembly is moveably mounted above the wafer similar to a scanner. The application of the solder material on the target surfaces is effected in continuous operation and rates in the range of above 1000 points/second can be achieved.

The solder assembly 10 comprises a plate-shaped holder designated with numeral 12. A piezo actor 14 which is described below in greater detail is fixed to the upper range of the holder 12 by means of a holder plate 18. A lower cooling body 16 with cooling ribs is fixed to the lower range of the holder 12. An upper cooling body 20 is provided in the range between the piezo actor 14 and the lower cooling body 16.

The lower cooling body 16 cools a jet head which is designated with numeral 22 in FIG. 1. A projecting jet 24 is provided at the lower end of the jet head 22. Various cylinder head screws which can be well recognized in the representation serve to fix the components to the holder.

Figure 8:
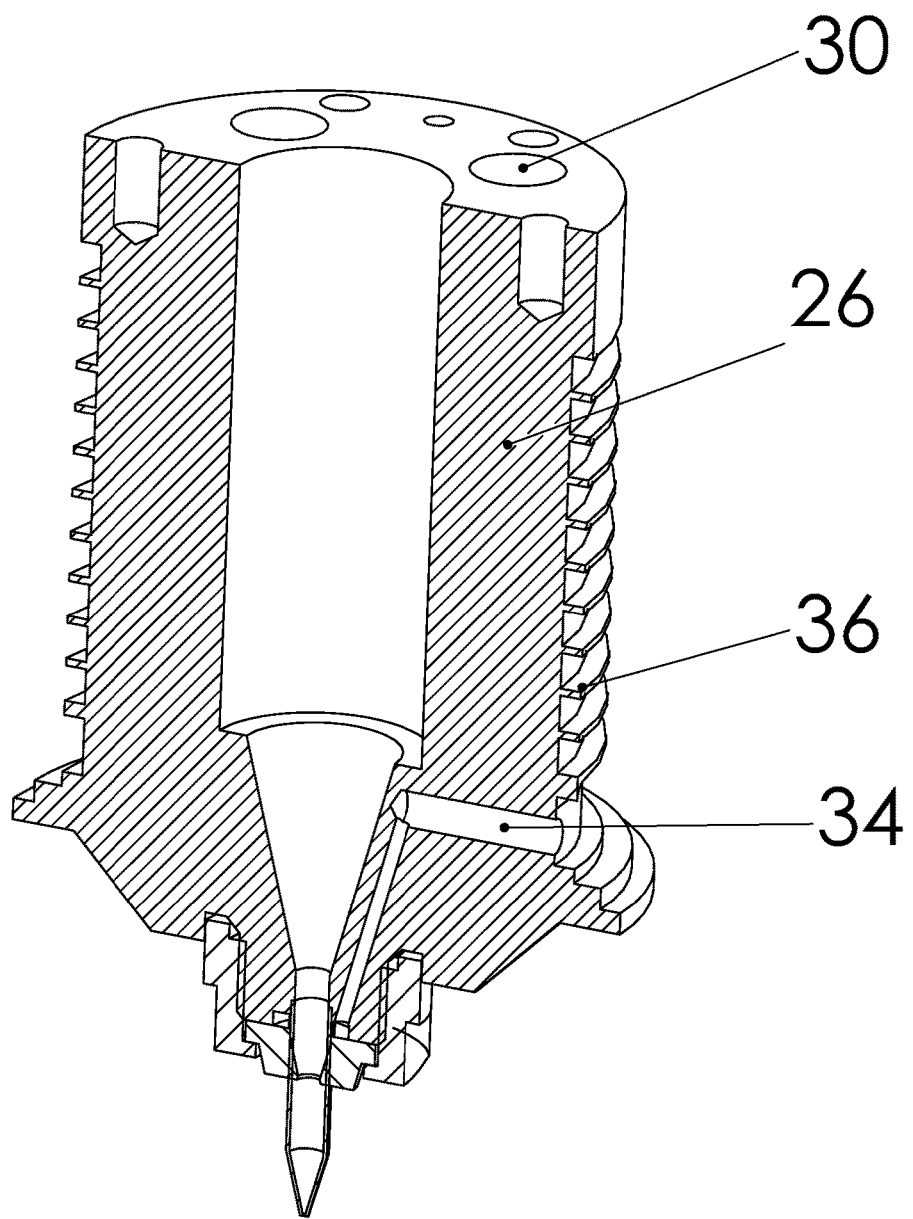
FIG. 8 is a partly sectional, perspective view of the stainless steel cylinder for the assembly of FIG. 1.

The jet head 22 essentially consists of a massive stainless steel cylinder 26. The stainless steel cylinder 26 is provided with a coaxial center bore hole 28. The stainless steel cylinder is separately shown in FIG. 8. The center bore hole forms a liquid reservoir. Four further bore holes 30 are provided in a circle around the center bore hole 28. Heating elements are arranged in such bore holes 30 which heat the jet head 22 to a temperature of, for example, 500° C. to 600° C. The stainless steel cylinder 26 sits in a tube-shaped ring 32 and is sealed against it. A spiral-shaped groove 36 is cut into the outside wall of the stainless steel cylinder 26. The upper end of the groove 36 is connected to a nitrogen source. The lower end of the groove 36 extends to a radial bore hole 34 which can be well seen in FIG. 6. If the ring 32 is shifted on the stainless steel cylinder 26 the groove forms an annular cooling canal where cooling nitrogen is flowed through towards the bore hole 34. In such a way the outside of the jet head 22 has a low temperature which can be well handled. The nitrogen heated in the canal is flowed from the bore hole in the direction of the jet 24 freely projecting downwards and provides additional heating thereof.

Figure 6:
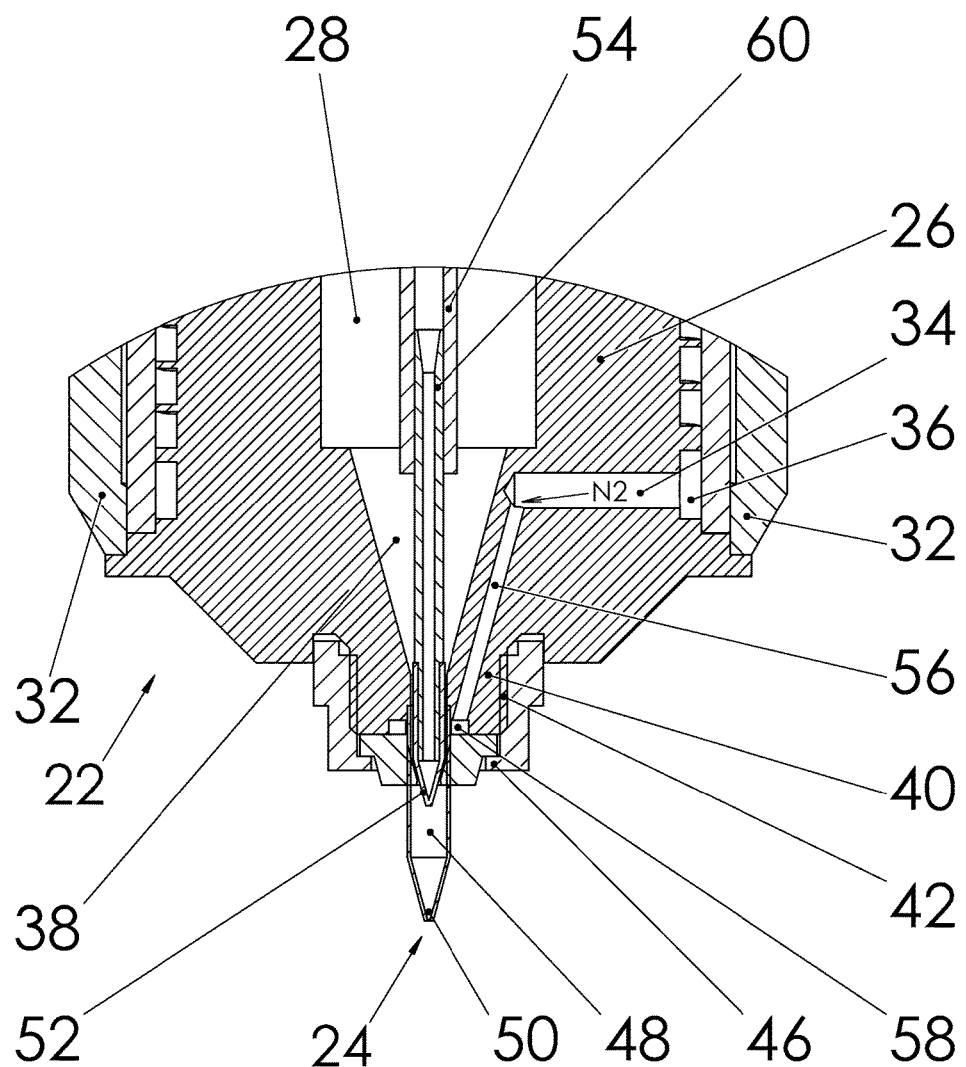
FIG. 6 is a detail of FIG. 3.

The center bore hole 28 is conically pointed towards its lower end 38. A threaded pin 40 with an outer thread 42 is integrated at the lower end of the stainless steel cylinder (FIG. 6). An adjustable head portion 44 is arranged therebelow. The head portion 44 is held in its position by a nut 46 screwed onto the threaded pin 40. The head portion 44 is provided with a center bore which is conically pointed in a downward direction. A jet portion 48 forming the jet 24 sits in such center bore the jet having an opening which is directed downwards. Typically, the jet opening has diameters in the range of some 10 microns to some 100 microns. The jet portion 48 sits tightly in the head portion 44 and extends with a tube-shaped upper range to the conical pointed range 38 of the center bore hole 28. This can be well recognized in FIG. 6.

A plunger 52 which is downwardly conical at its lower end is loosely inserted into the jet portion 48. A narrow annular space which also is conical is formed between the inner wall of the jet portion 48 and the plunger 52. The plunger 52 is hollow inside. A capillary is screwed into the plunger 52 at its upper end which extends through the entire center bore hole, i.e. through the entire liquid reservoir. In the present embodiment the capillary 60 is made of tungsten carbide. A capillary made of stainless steel, however, may also be used. The upper end of the capillary 60 is connected to the piezo actor 14. In such a way the plunger 52 can be moved upwards and downwards with a selected frequency between, for example, 200 to 1500 Hz. The capillary 60 is guided in the upper range inside the center bore hole 28 in a guiding 54. The capillary 60 which is exposed to high temperatures in the range of the liquid reservoir is cooled in the upper transition range to the piezo actor 14 with the annular cooling 20.

The threaded pin 40, the nut 46, the head portion 44 and the jet 48 freely project downwards beyond the stainless steel cylinder. The bore hole 34 ends in a downwardly inclined canal 56 ending in an annular space 58 in the range between the threaded pin and the head portion 44. Hot nitrogen absorbing the heat from the outside from the stainless steel cylinder now heats the projecting range and provides that the temperature in the tip is very high, higher than in the jet head.

Figure 7:
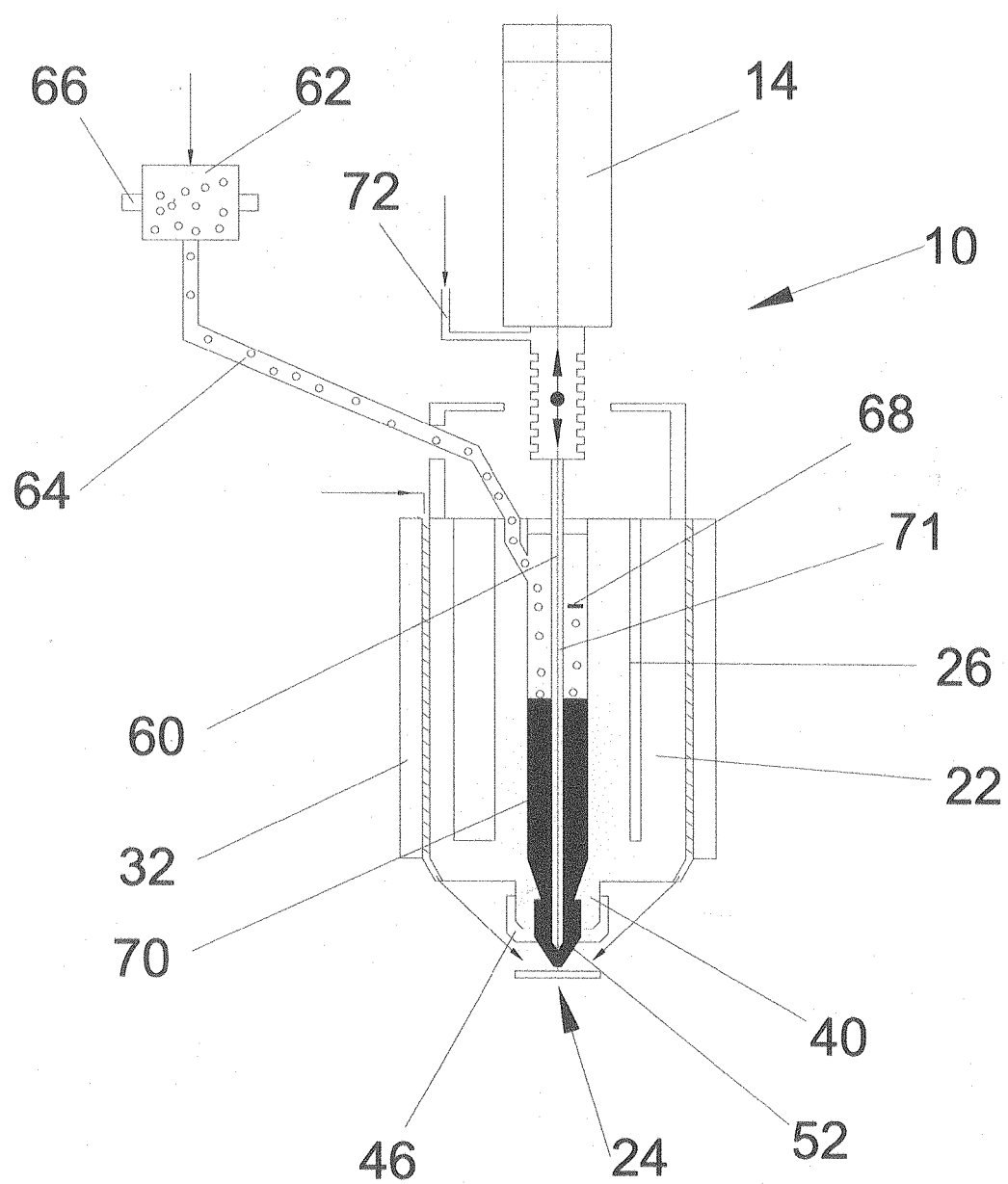
FIG. 7 is a schematic cross sectional representation for illustration of the way of operating of the re-filling method for solder balls.

FIG. 7 is a simplified representation of the assembly 10 where it can be seen how the solder material is applied. A reservoir 62 provided outside the assembly 10 is filled with balls of solid solder material. The balls are transported through a pipe 64 into the assembly 10. The pipe has diameters where without further measures the balls would remain sticking in there. Therefore, an ultrasound-vibrator 66 is provided. The vibrator 66 moves the reservoir 62 with high frequency back and forth. This will cause the balls to move and be transported downwards in the assembly 10.

The lower end of the pipe 64 ends in the center bore hole 28 of the heated stainless steel cylinder 26. The center bore hole 28 forms a liquid reservoir. The solder material fed here in the form of balls will melt and is available in the form of a liquid in the liquid reservoir 28 for further use. It is understood, that the solder material may also be inserted in any other form, for example in the form of a wire.

A filling-level sensor 68 is provided in the upper range of the center bore hole 28. The filling-level sensor 68 detects if there is sufficient solder material present in the liquid reservoir. As long as the filling-level sensor 68 is not reached the vibrator 66 is operated and further solder material is filled in. If the filling-level sensor 68 is reached the vibrator 66 is switched off for a selected operation period.

The liquid solder material is designated with numeral 70 in FIG. 7. It can be recognized that it extends down to the jet 24. The viscosity is still high enough with the selected temperature that the material will not exit through the opening of the jet portion 48. The plunger 52 is moved in a vertical direction upwards and downwards by means of the piezo actor 14. The lowest tip of the plunger 52 is moved in the conical range of the jet portion 48. The solder material present in the annular space between the inner wall of the jet portion 48 and the plunger 52 is forced through the jet opening 24 during the downward movement and ejected on the outside. The solder material acts simultaneously as a lubricant between the walls. The ejected material can be adjusted by adjusting the frequency of the plunger movement at the piezo actor 14 and the amplitude of the movement. It is, however, also possible to adjust the ejected material by adjusting the heating temperature in the stainless steel cylinder 26. A higher temperature will cause a lower viscosity and thereby a larger ejected mass and vice versa.

The plunger 52 and the capillary 60 are hollow. A laser beam 71 is guided through the plunger 52 and the capillary 60 down to the jet 24. With such a laser beam 71, for example from a diode laser, the ejected solder material is heated to, for example, 300° C. to 900° C. whereby it only cools and cures after finishing the application procedure. In addition nitrogen gas is flowed from a nitrogen reservoir through a pipe 72 into the capillary 60 and the plunger 52. Thereby, undesired oxidation and isolating solder points are avoided. Nitrogen is also flowed into the space above the liquid and pressurized to an increased pressure. Thereby, it is ensured that always the same amount of solder material is present in the annular space inside the jet portion 48. The ejected amount of solder material can also be influenced by the pressure in the space. A high pressure will cause a larger amount.

The optical path of the laser beam 71 is also used by means of a beam splitter to detect reflected infrared radiation. The temperature of the applied solder material can be derived therefrom.

The described assembly is particularly suitable for methods such as wafer bumping, substrate bumping, soldering in various dimensions and fine pitch wafer bumping. The amount of the generated solder points can be increased from presently about 5 to 10 points per second to more than 1000 points per second. The reproducibility is essentially increased with the described assembly.

The assembly described above was described in great detail. It is understood, however, that this is not limiting the scope of the patent which is exclusively determined by the claims. Many alternatives and equivalent means are known to the person skilled in the art which can be used without deviating from the idea of the invention. In particular, the geometric arrangement, materials, diameters and amounts can be varied without deviating from the basic idea of the invention.

What is claimed is:

1. An assembly for reproducible application of small amounts of liquid onto a target surface, comprising
   a liquid reservoir comprising liquid and having a underside;
   a plunger which is conically pointed in a downward direction;
   an actuator for moving said plunger back and forth between an opening direction and a closing direction,
   a jet portion a projecting, conical tip or jet provided at said underside of said liquid reservoir, said tip or jet having an opening for ejecting said liquid onto a target surface; and
   a center bore hole provided in said jet portion forming an inner wall which is conically pointed in a downward direction and extends down to said opening whereby a thin annular space which also conically narrows is formed between said inner wall of said jet portion and said plunger, wherein said plunger extends through all of said liquid in said liquid reservoir down into said center bore hole, whereby portions of said liquid are ejected through said opening outwards by said plunger in the direction of said opening.

2. The assembly of claim 1, and wherein said liquid is solder material or any other material which is solid at room temperature, said liquid being a substance having a melting point, and a heating element is provided for heating said liquid reservoir to a temperature above said melting point of said material.

3. The assembly of claim 1, and wherein a laser is provided emitting laser radiation towards the range of said opening.

4. The assembly of claim 3, and wherein said plunger is hollow and said laser radiation is guided through said plunger to said opening.

5. The assembly of claim 1, and wherein a gas source is provided with gas adapted to be guided into the range of said opening.

6. The assembly of claim 5, and wherein said gas is nitrogen or another inert gas or gas mixture.

7. The assembly of claim 5, and wherein said gas is heated.

8. The assembly of claim 1, and wherein a gas source is provided with an outer canal and said gas is guided through said outer canal from said gas source to the range of said opening, whereby heat can be absorbed from said liquid reservoir.

9. The assembly of claim 1, and wherein another reservoir is provided which is connected to said liquid reservoir by a canal and said liquid reservoir is filled from said other reservoir.

10. The assembly of claim 2 or 9, and wherein said material is present in the form of balls or other loose bulk material and a vibrator is provided adapted to guide said balls or loose bulk material through the said canal into said liquid reservoir upon activation.

* * * * *